Jan. 30, 1968

C. G. HEBEL 3,366,220

METHOD AND APPARATUS FOR SINGLE FILING

Filed Nov. 23, 1965

INVENTOR
Carl G. Hebel
BY
LeFever, Quillman & Hubbard
ATTORNEYS

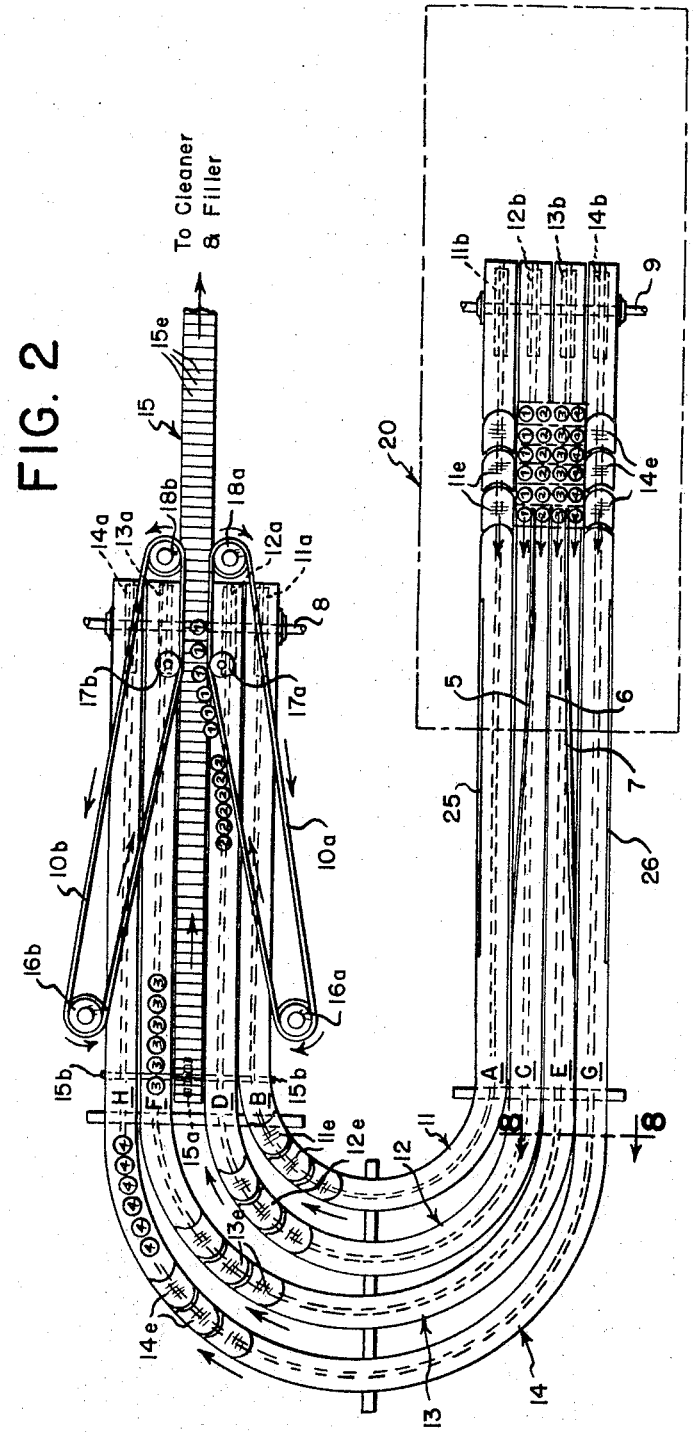

INVENTOR
Carl G. Hebel
BY
LeFever, Quillinan & Hubbard
ATTORNEYS

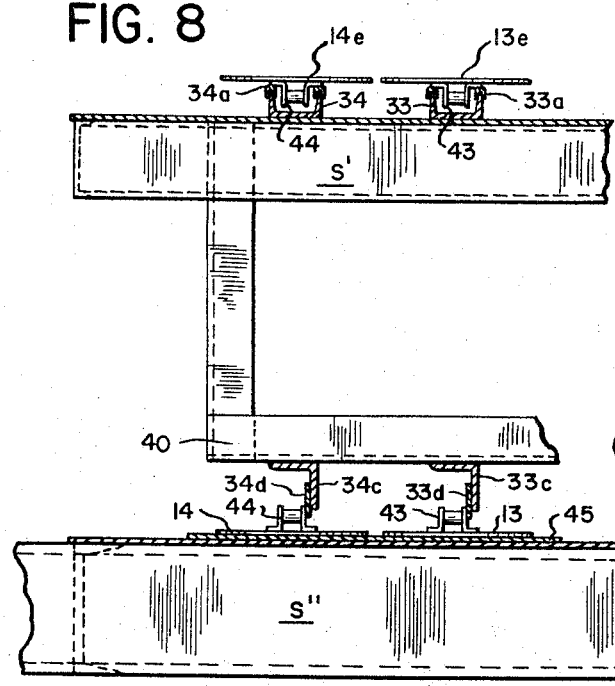
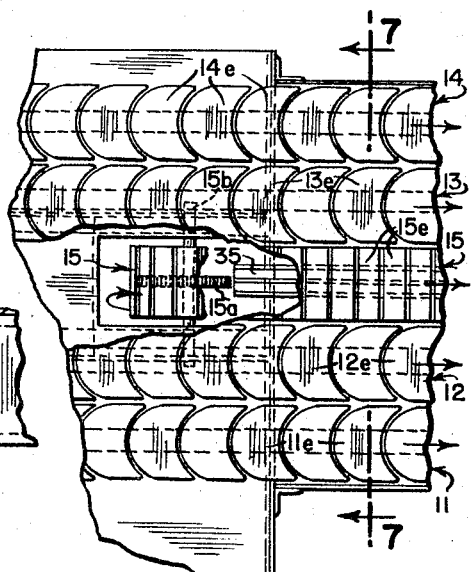
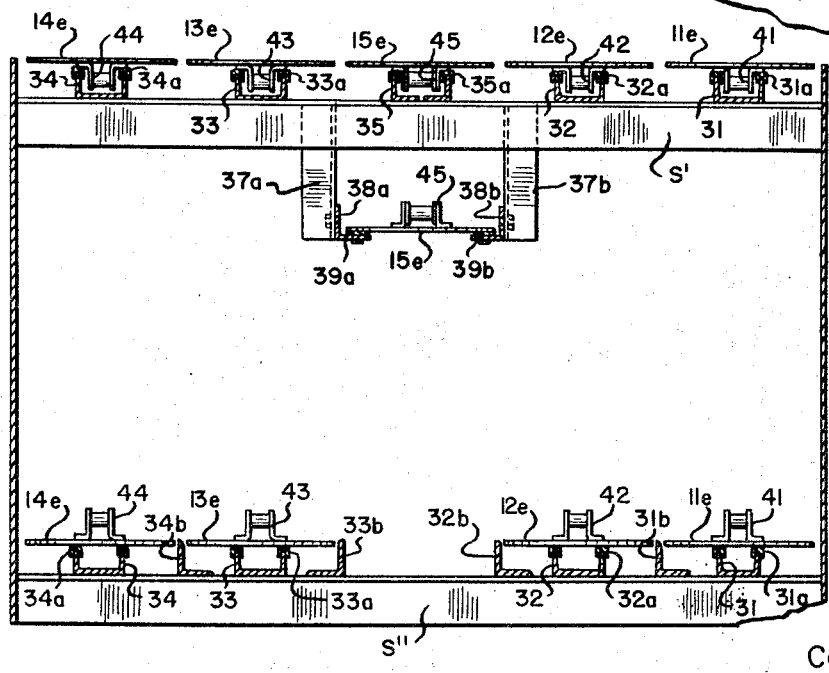

United States Patent Office 3,366,220
Patented Jan. 30, 1968

3,366,220
METHOD AND APPARATUS FOR
SINGLE FILING
Carl G. Hebel, Haworth, N.J., assignor to General Foods Corporation, White Plains, N.Y., a corporation of Delaware
Filed Nov. 23, 1965, Ser. No. 509,358
8 Claims. (Cl. 198—32)

ABSTRACT OF THE DISCLOSURE

Method and apparatus for single filing groups of articles arranged in laterally aligned rows by conveying said rows at the same speed over individual conveyer lanes of different length to thereby separate said rows in a lateral direction and then diverting the separated rows into a single file lane.

---

This invention relates to a method and apparatus for conveying and arranging articles, and more particularly, for conveying round and odd shaped containers into a single lane or file after being unloaded from the shipping cases.

In various packing operations there is a need for arranging a large number of articles, such as containers, which are discharged in groups of parallel columns and rows (corresponding to the arrangement of the empty containers in the shipping carton used to transport the containers from the manufacturer) into a single lane which is then fed to a filler, washer or similar type of apparatus.

Present single filers have a common fault in that frequent jamming of the machine is likely to occur due to wedging of containers as they enter the single lane channel. In general, these single filers operate by moving and conducting the multiple rows of containers from a relatively wide area into a narrow passage which forms the channel or lane for single filing of the containers being conveyed.

One method presently employed is to channel articles or containers from multiple lanes across a series of belts, each belt being run at a higher speed than the adjacent belt. The containers, as they move from belt to belt, are separated and eventually directed into a single lane or channel. In this method the containers have a tendency to bunch, turn and become disoriented as they move from one belt to another, particularly when odd shaped jars are used.

Another method presently employed provides individual stops for each row of containers. The rows are then released in sequence on a converging belt which ultimately terminates on a single belt with the rows in single file. This method necessitates stopping the rows on relatively fast moving belts. Stopping and starting containers on fast moving belts tends to cause them to tip and jam.

Another method presently employed is to move containers onto a belt or lane which runs at right angles to the travel of the multiple supply belts or lanes. The containers are then indexed onto the right angle conveyer by the use of mechanical stops. In this method it becomes necessary to use "dead" plates at the transfer points. These "dead" plates frequently cause tipping of the containers thereby creating jams which result in jar breakage if glass containers are used.

Still another method involves the use of oscillating or movable article guides such as a swinging trough which transfers containers from multiple lanes or conveyers onto a single lane or conveyer. This method requires very precise timing and adjusting and can only be used on containers of suitable contour and cross-section.

In all these methods, there is a tendency to block or jam the machine due to wedging of containers at the entrance to the single file channel. The disadvantages that this causes are evident. These include container breakage, interruption of the continuous delivery of containers to the automatic machines at the end of the conveyer line, and the need for a manual operator to remove the wedged containers.

One of the features and advantages of the present invention is the fact that a single filing machine and method is provided wherein a group of containers arranged in parallel columns and rows as discharged from the shipping cases are received by a plurality of feed conveyers and transferred to a single file conveyer, the feed conveyers and shipping cases traveling at the same speed relative to one another in the area where the containers are discharged onto the conveyers and the feed belts traveling at the same speed over paths of different length and having means at the terminal portion of each path for diverting the individual rows of containers to the single file conveyer.

It is, therefore, an object oft his invention to receive a plurality of articles in individual rows which are kept in continuous movement while being separated at all times prior to merging into a single file.

Another object of this invention is to avoid jamming or bunching of articles and containers as they are being arranged in single file.

Another object of this invention is to single file articles or containers from a plurality of lanes into a single lane without tipping or moving the containers at right angles.

Another object of this invention is to single-file articles or containers at higher speeds than conventional single-filers.

Still another object of this invention is to move articles in a definite path in individual lanes with a minimum of contact thereby greatly reducing the tendency of damage or breakage.

A further object of this invention is to single file odd shaped articles and containers from a plurality of lanes into a single lane without changing the orientation of the containers.

Other objects of this invention will become apparent upon referring to the accompanying drawings and specification in which similar characters of reference represent corresponding parts.

This invention is founded on the discovery that an improved method and apparatus for single filing articles arranged in individual rows is provided by continuously moving individual rows of articles over paths of different length to separate the individual rows for single filing, and then diverting the separated rows into a single file.

In the drawings:

FIG. 2 is a plan view of the single filer machine and shows a group of containers being separated into single lanes and merged into a single file;

FIG. 6 is a relatively enlarged plan view of the feed conveyors and the single file conveyor;

FIG. 7 is a detailed cross sectional view of the feed conveyors, the single file conveyor and their return conveyers along line 7—7 of FIG. 6;

FIG. 8 is an enlarged detailed fragmentary view of a cross-section of two conveying belts taken along line 8—8 of FIG. 2;

In these figures there is shown a conveyor mechanism for transferring rows of articles into a single file as they are discharged in an orderly arrangement from their respective shipping cases. Although these articles are shown as jars, it is evident that such articles may be cans, bottles, containers, or any other articles which requires single filing further processing at a work center.

Figure 1:
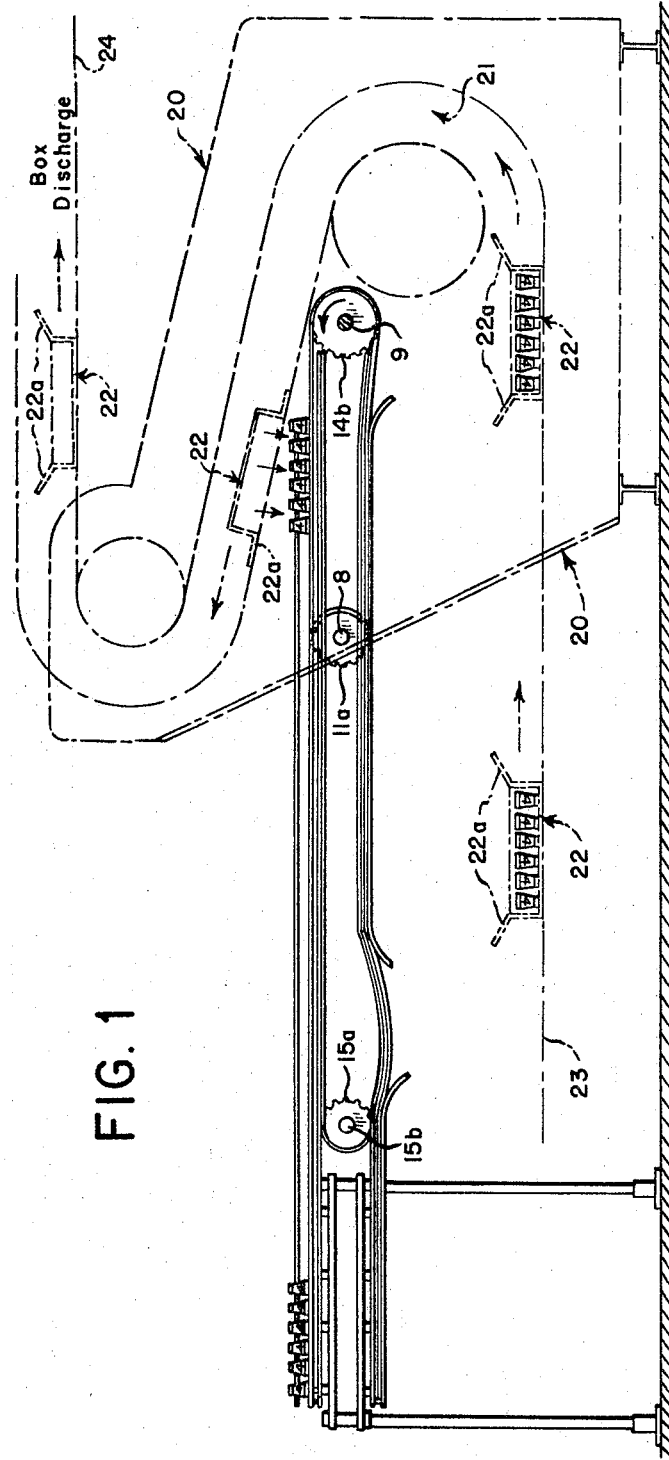
FIG. 1 is a side elevation view of the single filing machine of this invention and parts of associated machines.

The general arrangement of the single filer apparatus is shown in FIGS. 1 and 2.

FIG. 2 shows four individual rows of jars 1, 2, 3, and 4 being distributed by channel members 5, 6 and on crescent-type feed conveyors 11, 12, 13 and 14 adapted to travel in arcuate path until the jars are single filed on flat-top chain conveyors 15. The feed conveyors 11, 12, 13 and 14 made up of individual crescent plates 11e, 12e, 13e and 14e are driven by sprocket wheels 11a, 12a, 13a and 14a connected to common shaft 8 which is driven by an electric motor (not shown). Idler sprockets 11b, 12b, 13b and 14b connected to common shaft 9 are used to direct the return chain conveyors to the case dumping area at which point they become feed conveyors. The return for each conveyor is directly under the path of travel of the jars. The flat-top chain conveyor 15, made up of individual flat-top plates 15e, is driven by a sprocke wheel 15a which is connected to separate electric motor (not shown) by shaft 15b. This conveyor is also returned directly under the path of travel of a pair of diverting belts 10a and 10b driven by pulleys 16a and 16b connected to a common drive means and having adjustable idlers 17a, 17b, 18a and 18b is used for moving th separated rows of jars onto the single file conveyor 15 from feed conveyors 11–14.

The jars are placed on the conveyor by a conventional case unloader 20 having a channel 21 which leads onto the crescent type feed conveyors as shown in FIG. 1. The unloader 20 receives shipping cases 22 from belt 23 with flaps 22a opened and the packed jars in an inverte position. The unloader picks up the case 22 by means of pick-up bars (not shown) and transports the case through the channel 21. Case 22 is inverted by the unloader discharging oriented empty jars onto the single file conveyers, and the empty case is discharged onto belt 24. The unpacked jars are placed on the conveyers in four rows indicated as 1—1, 2—2, 3—3 and 4—4 and six columns indicated as 1-2-3-4 (FIG. 2).

Figure 3:
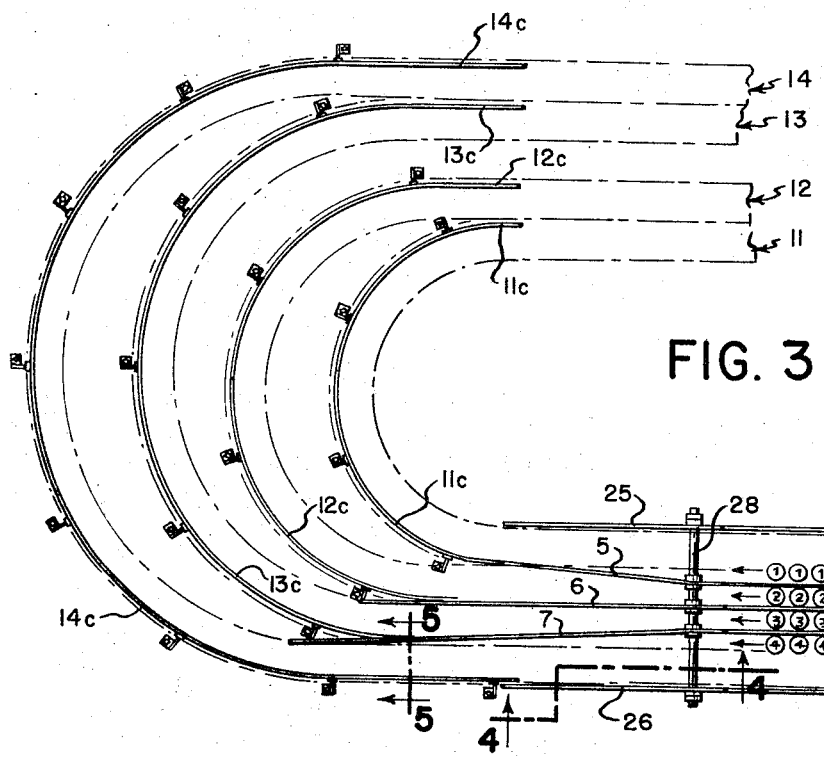
FIG. 3 is a plan view of the guide rails and channel members for the single filer.
Figure 4:
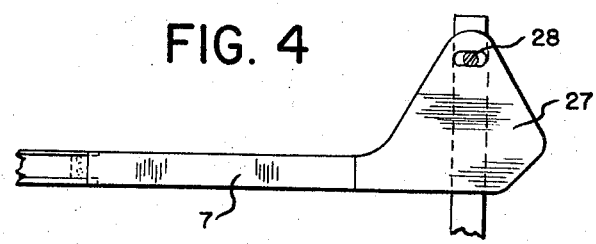
FIG. 4 is a relatively enlarged side view of the channel member taken along the line 4—4 of FIG. 3.
Figure 5:
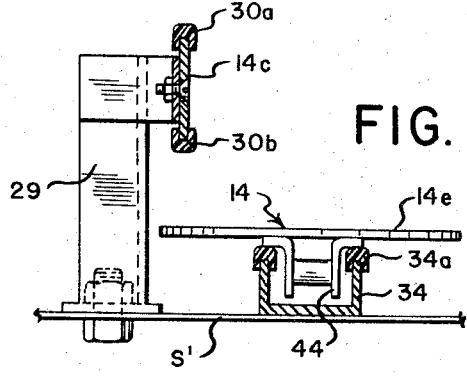
FIG. 5 is a relatively enlarged cross-sectional view of the end guide rail and conveyer left taken along line 5—5 of FIG. 3.

The channel members 5, 6 and 7 and guide rails 11c, 12c, 13c and 14c for the single filer are shown in more detail in FIGS. 3, 4 and 5. Guide rails 11c to 14c are shown in FIG. 3 meshing with channel members 5, 6 and 7 and walls 25 and 26. The channel members have an extended bracket portion 27 used to connect the members to a permanent support bar 28 as shown in FIG. 4. The guide rails may be connected by angle brackets 29 to support plate S′ as shown in FIG. 5. The guide rails include plastic cushion tips 30a and 30b which provide fricitonless guide wear surfaces. FIG. 5 also shows the dispositon of the guide rails 14c in regard to the crescent type chain 14 which rides in track member 34 having a nylon type contact 34b to provide a frictionless wear contact with the bottom of the crescent chain plate 14.

Further structural details of the feed conveyers and the flat-top chain conveyers are shown in FIGS. 6–9. The individual crescent-shaped plates for each feed conveyor 11, 12, 13 and 14 and the individual rectangular plates for single file conveyor 15 are shown in FIG. 6. A cutaway portion of this figure shows the track 35 for the flat-top chain conveyor 15 and the idler sprocket wheel 15a and shaft 15b for this conveyor. A transverse sectional view of the track means and return guides for the con veyers 11–15 and the linear terminal portion of single filer is shown in FIG. 7. The crescent-type feed conveyers 11–14 ride in tracks 31–34 by means of links 41–44 which contact the frictionless surfaces 31a–34a. The tracks are secured to upper support member S′. Return of the crescent chains is provided by having the inverted plates ride on the frictionless contacts 31a–34a of tracks 31–34 placed on lower support member S″. Return guides 31b to 34b keep the crescent chains in their proper return lane. The flat-top chain 15 rides by means of links 45 on the contacts 35a of track 35 and return of the flat-top chain is provided by having the inverted plates ride on wear plates 39a and 39b. These wear plates are supported by extended arms 37a and 37b and brackets 38a and 38b.

The arrangement for returning the crescent chains in the arcuate or curved portion is shown in FIG. 8. The inverted crescent plates ride on a wear plate 45, the crescent plates being kept in their proper lanes by guides 34c and 33c which are connected to angle bracket 40 extending from support S′. Wear plate 34d and 33d are attached to the guides.

Figure 9:
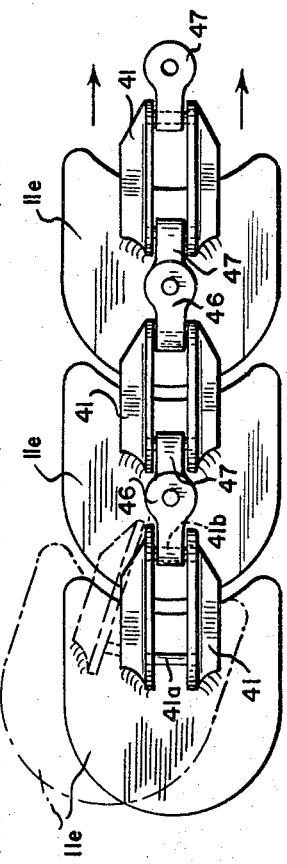
FIG. 9 is a detailed bottom view of one form of conveying chain which could be used in the single filing device.

FIG. 9 shows the manner of connecting the individual crescent plates 11e to form conveyor 11. The individual plates 11e are integral with the rear portion of the link member 41. The link member is composed of two L shaped arms which extend downwardly onto the track means as shown in FIGS. 5, 7 and 8. The arms are connected by transverse pins 41a and 41b which are used for connecting with link members 46 and 47. This arrangement allows the crescent plates and the link members to travel in an arcuate path as well as a linear path. Flat-top conveyor 15 has the rectangular plates 15e connected in the same manner.

Operation of the single filer apparatus shown in the drawings is as follows: Shipping cartons 22 having flaps 22a opened and the packed jars in an inverted position are placed on a lead-on conveyor 23 which feeds the unloader 20. Before the opened shipping cases are picked up by the unloader an indexing device (not shown) retains the shipping case until the proper time for the case to be moved onto the pick up bar conveyor. The shipping case 22, once it enters the unloader, passes through channel 21 and unloads the jars in an upright position onto belts 12 and 13 of the single filer. This is the linear, initial portion of the single filer. The jars which may be of the non-circular type difficult to single file, are placed on the two conveyers in an oriented arrangement having rows and columns similar to that present in the packed case. The individual rows of jars are then channeled onto their proper conveyors 11–14. If desired, the arrangement could be modified to have the jars unloaded directly onto each conveyor. Row 1 is channeled onto conveyor 11 by channel member 5 and sidewall 25, row 2 of jars is channeled onto conveyor 12 by channel members 5 and 6, row 3 of the jars is channeled onto conveyor 13 by channel members 6 and 7 and row 4 of the jars is channelled onto conveyor 14 by channel member 7 and sidewall 26. The rows of jars, once channelled onto their proper conveyor lanes, are then moved over paths of differing length in order to laterally separate the individual rows of jars in relation to one another. The rows of jars, after lateral separation by the arcuate middle portions of the conveyor lane, move onto the terminal portion of the single filer apparatus. This terminal portion of the conveyor assumes a linear pattern again and the separated rows of jars are then diverted onto single file conveyer 15 by a pair of diverting belts 10a and 10b. As shown in FIG. 2, diverting belt 10a contacts row 1 of the jars and deflects the jars onto conveyor 12 and, in turn, onto conveyer 15 which is moving at a higher speed than the feed conveyers 11, 12, 13 and 14. As each jar enters onto conveyer 15, it is separated relative to the next succeeding jar. After row 1 of the jars has been single filed on conveyer 15, the jars separated by conveyor 12 have reached the deflecting area of the diverting belts and row 2 of the jars is now deflected onto conveyer 15 in the same manner as row 1 was deflected. Immediately after row 2 is single filed onto conveyor 15, row 3 of the jars reaches the point on conveyer 13 with this row of jars is ready to be deflected onto conveyer 15 by diverting belt 10b. After row 3 is single filed, row 4 is in turn single filed in the same manner by diverting belt 10b. The jars now in single file on conveyer 15 move to further work stations such as a cleaner station and a filler station.

While this invention has been described with reference to a particular type of apparatus as shown in the above drawings, it is understood that the basic principle used in the design of this device is to maintain rows of articles separated during the single filing operation. For example, any conventional conveyer, similar to the crescent-type chain and the flat-top chain may be used to single file the articles. Any case unloader may be used for dumping the articles onto the conveyer, this may even be done manually if desired. In single filing according to this invention, it is essential to provide individual conveyers for each row of conveyers as the individual rows are discharged from the shipping case. It is also essential that the length of each feed conveyer be different and this length is determined by the length of the longest shipping case which would be run on the packing line. The number of conveyers is determined by the maximum numbers of rows in the shipping cases being packed in the line. While the drawings show a specific type of arcuate path on which the jars travel, it is understood that the particular pattern under which the jars travel may vary greatly as long as the travel of each conveyor is over a path of different length.

In the case where the shipping case has a pattern of four rows and six columns and the shipping case length is about 24″ long and 12″ wide, the conveyer channel members and guides must be adjusted at the dumping station to channel the four rows of containers onto their respective conveyers. The distance from the point of discharge of each row from the shipping case to A, C, E and G, is designed to be substantially equal. However, the distance from A to B is constructed to equal the length of row of the containers as they are discharged onto the single filer plus an additional length (say 12″) to compensate for variations in rows and clearances between rows at the points of convergence. In this case, the distance would be about 36″ (24″ row length plus 12″ for clearances, etc.). The distance from C to D would be 72″. The distance from E to F would be 108″. Finally, the distance from G to H would be 144″. Since all the feed conveyers 11–14 are moving at the same number of feet per minute and only single file conveyer 15 is moving at a higher speed, conveyer 11 would pass point B when conveyer 12 has moved only ½ the distance from C to D, row 13 has moved only ⅓ the distance from E to F, and row 14 has only moved ¼ the distance from G to H. Row 1 of jars will pass line B–H first, followed by row 2 then row 3 and finally row 4. As row 4 of jars passes point H, another case of containers is discharged at the receiving station and the cycle repeated. If a smaller length case with the same number or less number of rows is desired to be single filed, the unit can easily be adjusted to accomplish this. Any shipping case which is longer or has a greater number of rows than the shipping case described above cannot be run on this single filer without modifying the design.

Since it is essential that all the feed conveyers be moving at the same speed, it is understood that in order to separate the individual rows for single filing that the conveyers all have a path distance which is a multiple of the smallest conveyer. This means that the path or distance of the smallest conveyer can be any length consistent with good engineering practice but the length of second shortest conveyer must be at least the length of the longest row being deposited on the feed conveyers plus the additional length of the shortest conveyer. In actual practice, a good rule to follow is to have the length of the shortest conveyer be determined by the length of the longest row being deposited on said conveyers, the next conveyer being a multiple of the shortest conveyer, the third conveyer being two multiples of the shortest conveyer, etc. Of course, an additional length for clearances should be applied to the length of the shortest conveyer in determining the multiples.

It is preferred, in order to achieve the required conveyer length ratios, that a reversal of conveyer direction be employed. The most compact arrangement is a 180° reversal of direction, similar to that shown in the drawing. However, if this compact arrangement is not necessary, it is understood that this arrangement can be accomplished without reversing the direction but merely having the feed conveyers fan out in an arcuate path.

It is also understood that the single filer conveyer may be arranged between conveyers 12 and 13 and may be placed adjacent to conveyer 14 or conveyer 11 and only a single diverting belt used. Instead of an arcuate path for the conveyer lengths to travel, a rectangular path or other arrangement could be used as long as the essential multiple distance ratios in each conveyer are preserved. Return of the conveyer belts may be accomplished as shown on the drawing or merely by having the conveyers continue on a single plane for the return to the jar receiving or case unloader station.

While this invention has been described by reference to specific methods and apparatus for single filing articles such as jars, it is understood to have much broader application. Reference may be had to the following claims to determine the proper scope of this invention.

What is claimed is:

1. A machine adapted to receive continuously moving groups of articles arranged in rows and columns, separate said rows, and single file the separated rows which comprises a series of substantially horizontal feed conveyers traveling at the same speed and a single file conveyer traveling at least at the same speed as the feed conveyers, said feed conveyers having a receiving station for receiving a group of articles arranged in registered rows and columns, and a discharge station for sequential transfer of said rows to the single file conveyer, the paths of said feed conveyers each having a distance between said receiving stations and said discharge station which is at least a multiple of the shortest feed conveyer and the length of the second shortest conveyer being determined by the sum of the length of the longest row being deposited on said feed conveyers plus the length of the shortest conveyer to thereby separate said rows of articles as said rows are conveyed to the discharge station, and means at the discharge station for sequentially diverting said separated rows of articles from the feed conveyers onto the single file conveyer, said single file conveyer moving at a speed which is greater than the speed of the feed conveyers.

2. The machine of claim 1 wherein the path of the shortest feed conveyer is at least the distance of the longest row being deposited on said series of feed conveyers and each succeeding feed conveyer has an additional length of at least the distance of said longest row.

3. A single filing machine for receiving groups of articles arranged in laterally aligned rows which comprises a series of substantially horizontal feed conveyers and a single conveyer, said single file conveyer located adjacent the terminal portion of said feed conveyers; means for driving said feed conveyers at the same relative speed, means for driving said single file conveyer at a speed at least equal to that of the feed conveyers; means for distributing said groups of articles in laterally aligned rows on said feed conveyers, each succesive group being spaced from the preceding group a distance equivalent to the combined length of all the rows in said group; said feed conveyers each being of a different length to thereby separate rows of articles being single filed, the length of the shortest conveyer being a length sufficient to transfer a row of articles to the terminal portion of said feed conveyers while the length of each successive conveyer is at least the sum of the length of the preceding conveyer plus the length of the individual row being single filed; and means at the terminal portion of said feed conveyers for sequentially diverting said separated rows of articles from the feed conveyers onto the single file conveyer.

4. The machine of claim 3 wherein said feed conveyers have parallel initial portions which are linear and of the same length, non-parallel middle portions which are arcuate and of different length, and parallel terminal portions which are linear and of the same length, the length of the shortest arcuate middle portion being sufficient to transfer a row of articles to the terminal portion of said feed conveyers and each successive arcuate portion having a length which is at least the sum of the distance of the preceding arcuate portion plus the length of the individual row being conveyed to thereby laterally separate rows moving at the same speed.

5. The machine of claim 4 wherein the feed conveyers and single file conveyer are in the same horizontal plane, the single filer moves at a speed greater than the feed conveyers, and the feed conveyers have a reversal in direction of 180° as the rows of articles are separated.

6. The machine of claim 4 wherein the length of the shortest arcuate middle portion is at least the length of the longest row being single filed and each successive arcuate portion is a progressive multiple of the shortest arcuate portion.

7. The machine of claim 6 wherein the feed conveyers and single file conveyer are in the same horizontal plane, the single filer moves at a speed greater than the feed conveyers, and the feed conveyers have a reversal in direction of 180° as the rows of articles are separated.

8. The machine of claim 7 wherein the articles single filed are upright and said feed conveyers have guide members for retaining said articles in upright position during movement.

References Cited
UNITED STATES PATENTS

| | | | |
|---|---|---|---|
| 2,912,093 | 11/1959 | Lauck | 198—32 |
| 3,164,243 | 1/1965 | Rudszinat et al. | 198—32 |
| 3,176,825 | 4/1965 | Rudszinat et al. | 198—32 |

EVON C. BLUNK, *Primary Examiner.*

GERALD M. FORLENZA, *Examiner.*

R. J. HICKEY, *Assistant Examiner.*